United States Patent [19]
Darin

[11] Patent Number: 4,763,542
[45] Date of Patent: Aug. 16, 1988

[54] SIDE YOKE FOR VEHICLE DIFFERENTIAL

[76] Inventor: James Darin, 20345 Swansea Rd., Baltimore, Md. 21239

[21] Appl. No.: 763,217

[22] Filed: Aug. 7, 1985

[51] Int. Cl.⁴ ............................................. F16H 1/40
[52] U.S. Cl. ...................................... 74/713; 29/159.2
[58] Field of Search ............... 74/710, 713, 607, 409, 74/711, 606 R; 29/159.2, 402.06, 402.12, 402.15

[56] References Cited

U.S. PATENT DOCUMENTS

| | | | |
|---|---|---|---|
| 740,052 | 9/1903 | Smith | 301/114 |
| 1,006,847 | 10/1911 | Heaslet | 74/713 |
| 1,050,986 | 1/1913 | Nelson | 74/713 |
| 1,226,854 | 5/1917 | Bower | 74/713 |
| 2,364,411 | 12/1944 | White | 74/713 |
| 3,013,440 | 12/1961 | White | 29/152 |
| 3,198,036 | 8/1965 | Müller | 74/607 |
| 3,283,843 | 11/1966 | Runyan | 180/88 |
| 3,308,682 | 3/1967 | Puidokas | 74/607 |
| 3,347,110 | 10/1967 | Wilson | 74/409 |
| 3,554,048 | 1/1971 | Adams | 74/409 X |
| 3,572,157 | 3/1971 | Adams et al. | 74/409 X |
| 3,853,022 | 12/1974 | Duer | 74/713 |
| 3,888,137 | 6/1975 | Brieten | 74/711 X |
| 4,037,492 | 7/1977 | Ashauer | 74/710 |
| 4,388,842 | 6/1983 | Marcell | 74/713 |
| 4,441,378 | 4/1984 | Ponczek | 74/606 R X |
| 4,455,889 | 6/1984 | Hauser | 74/710 |
| 4,583,424 | 4/1986 | von Hiddessen et al. | 74/713 |

*Primary Examiner*—Leslie Braun
*Assistant Examiner*—David Novais
*Attorney, Agent, or Firm*—Holman & Stern

[57] ABSTRACT

The inboard end of a side yoke for a vehicle differential which is subject to wear by knocking against the pinion shaft in a differential case is provided with a heat treated hardened steel wear button to prevent such wear. In reconditioning a worn side yoke, the worn end of the yoke is removed by grinding and then formed with a blind bore to receive the shank of the wear button. The wear button is press fitted into the blind bore.

5 Claims, 1 Drawing Sheet

SIDE YOKE FOR VEHICLE DIFFERENTIAL

BACKGROUND OF THE INVENTION

This invention relates to differential assemblies as used in rear-wheel drive vehicles, and more particularly to a side yoke component for such an assembly.

As is well known in the art, a differential assembly for a rear-wheel drive vehicle is a form of gear box which transmits drive from the vehicle propellor shaft to the rear wheels in a manner compensating, inter alia, for a requisite differential in rotary wheel speed as between the inner and outer wheels when, for example, the vehicle is negotiating a curve. Simply stated, a differential assemby commonly includes a rotary differential case mounted in a differential carrier, the case having an external ring gear rotated by a pinion on the end of the propellor shaft, the case carrying a pair of oppositely extending rotary half-shafts or side yokes for driving the respective rear wheels, the side yokes having bevel gears inside of the case which mesh with or orthoganally disposed bevel pinions mounted on opposite ends of a transverse pinion shaft, so as to provide the differential action. The side yokes extend through rotary bearings and seals in the differential carrier for connection to the respective rear wheels.

In certain vehicles, more particularly Chevrolet Corvette automobiles, there is a tendency after a certain mileage, usually about 50,000 miles, for wear in the differential assemblies to cause play allowing the side yokes to shift axially inwardly relative to the differential case and jar or knock against the pinion shaft. This can lead to grinding away of the end of the side yoke causing excessive negative camber, which in turn can lead to uneven tire wear and poor driving stability. It can also cause particles of the side yokes to embed themselves in the differential clutch plates causing slippage of the positraction unit resulting in a clunking or thumping noise. If the wear is left unchecked, it may increase to a point where the flange will shear or cut into the differential case causing a leakage of fluid and ultimately leading to complete destruction of the differential assembly.

It is an object of the present invention to provide a solution to the problem of side yoke wear caused by grinding of the yoke end against the differential pinion shaft which does not involve having to replace an entire side yoke.

SUMMARY OF THE INVENTION

In accordance with the invention, a differential side yoke for a vehicle differential, particularly in a Chevrolet Corvette, is provided at its inboard end, which in the event of differential wear tends to jar against the differential pinion shaft, with a wear button of heat treated hardened steel.

The invention is primarily intended as a means for reconditioning worn side yokes by removing the worn inboard end thereof, forming a blind bore in the cut away end of the yoke, and press fitting the hardened steel wear button, having a suitably dimensioned shank, into the blind bore. The button is splined to conform with splines on the end of the yoke, and may have a circumferential groove to receive a standard snap ring or circlip which retains the yoke and associated bevel gear in place in the differential case.

To ensure adequate retention of the button shank in the blind bore of the yoke, and prevent cracking, a fillet may be provided at the junction of the button head and the shank, and for added security a radial screw may be inserted through the yoke engaging the shank. To adequately resist wear by jarring against the differential pinion shaft, the button should preferably be heat treated to a Rockwell hardness in the 58-62 range.

The invention is useful in restoring worn side yokes in a manner precluding further wear at the inboard end, and is also applicable to new yokes in order to avoid such wear.

Additional features and advantages of the invention will be apparent from the ensuing description and claims read in conjunction with the accompanying drawings.

BRIEF DESCRIPTION OF DRAWINGS

FIG. 2 is an exploded view of the inboard end of a side yoke for the assembly and a heat treated wear button for fitting therein.

DESCRIPTION OF PREFERRED EMBODIMENT

Figure 1:
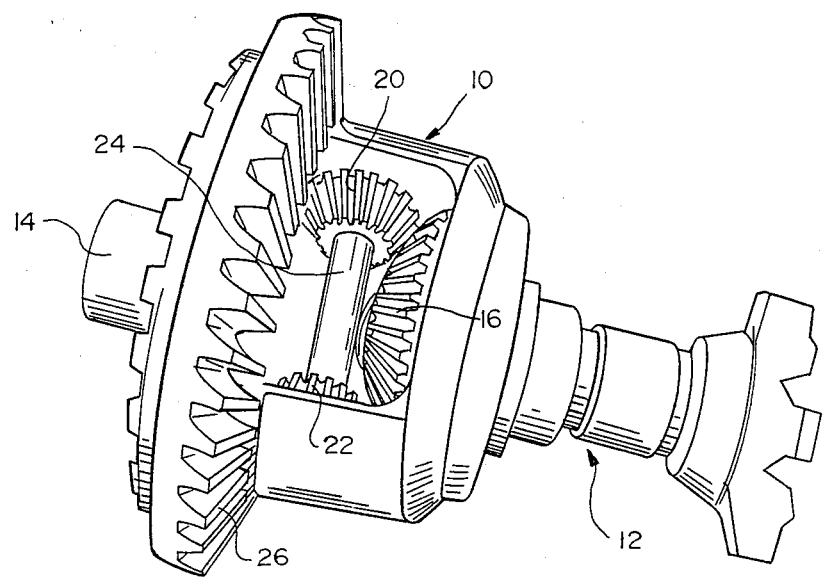
FIG. 1 is a perspective view, somewhat simplified, of part of a differential assembly for a Chevrolet Corvette car.
Figure 1:
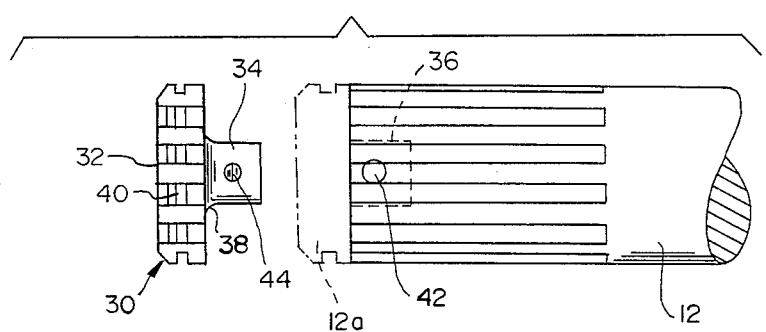

Referring initially to FIG. 1, there is shown a differential case 10 for a Chevrolet Corvette, for fitting, in well known manner, in a differential carrier so as to transmit drive from a propellar shaft (not shown) to the rear wheels of the vehicle through respective side yokes, only one such side yoke 12 being shown in FIG. 1. At the inboard end, side yoke 12 carries a differential side gear 16 which meshes internally of case 10 with differential pinions 20, 22 carried on a pinion shaft 24 mounted in the case orthogonally to the axes of the side yoke. The case 10 has an outer ring gear 26 to mesh with a pinion at the end of the propellor shaft. The inboard end of the side yoke 12 is splined to receive the side gear, and a circlip (not shown) is located in a circumferential groove adjacent the end of the yoke to retain the components in assembled relation.

It is understood that in practice a like side yoke (not shown) is provided extending into the opposite side of the case through a bushing 14 and carrying a further beveled side gear meshing with pinions 20, 22 so as to provide a differential drive to the respective rear wheels.

As previously noted, when the differential wears, after about 50,000 miles generally, the side yokes tend to move axially and knock against the differential shaft 24, eventually wearing away the side yokes. In accordance with the invention, therefore, when the differential is dismantled, the inboard end portions of the respective side yokes are removed (as indicated at 12a in FIG. 2 with respect to side yoke 12), for example by grinding, and replaced in each case with a heat treated hardened steel wear button, such as wear button 30 shown in FIG. 2.

The wear button has a disc-like body portion 32 splined to match the removed end of the side yoke, and a reduced diameter shank 34 for press-fitting into a blind bore 36 drilled in the ground end of the yoke. The shank-body portion junction is preferably filleted as indicated at 38 to prevent cracking, and the body portion 32 is formed with a circumferential groove 40 for the aforementioned circlip. The button may, for example, be heat treated to a Rockwell hardness in the range 58 to 62. The axial length of each of the body portion and shank portion of the button may, for example, be 0.375 inch, and the diameter of the shank may be about 0.376 inch. The button may be press-fitted into bore 36 with a pressure of about 25 tons which is per se sufficient to retain the button in place, but for additional security an Allen screw may be fitted in aligned holes 42, 44 in the yoke end and in the button.

It is found that the hardened button effectively improves the side yoke in respect of the wear problem of its inboard end previously described. While only a preferred embodiment of the invention has been described herein in detail, the invention is not limited thereby and modifications can be made within the scope of the attached claims.

I claim:

1. A method of reconditioning an inboard end of a vehicle differential side yoke worn by knocking against a pinion shaft in a differential case, the method comprising removing the worn end of the yoke by grinding or the like, forming a blind bore in the end of the yoke, providing a hardened steel wear button having a disc-like splined body portion and a reduced-diameter shank portion for press fitting into the blind bore in the end of the side yoke, and press fitting the shank of the button into the blind bore to retain same in the end of the yoke.

2. The invention of claim 1 wherein the button is press fitted into the blind bore with a force of about 25 tons.

3. The invention of claim 1 including forming aligned radial holes in the end of the yoke and the shank portion of the button and inserting a screw in said holes.

4. A method of reconditioning an inboard end of a vehicle differential side yoke worn by knocking against a pinion shaft in a differential case, the method comprising removing the worn end of the yoke by grinding or the like, forming a blind bore in the end of the yoke, providing a hardened steel wear button having a disc-like splined body portion and a reduced-diameter shank portion for fitting into the blind bore in the end of the side yoke, fitting the shank portion of the button into the blind bore and securing the shank portion in the bore to retain same in the end of the yoke.

5. The invention of claim 4 wherein the shank portion of the button is secured in the bore by forming aligned holes in the end of the yoke and the shank portion and inserting a screw in said holes.

* * * * *